US007111231B1

(12) United States Patent
Huck et al.

(10) Patent No.: US 7,111,231 B1
(45) Date of Patent: Sep. 19, 2006

(54) SYSTEM AND METHODOLOGY FOR DYNAMIC APPLICATION ENVIRONMENT EMPLOYING RUNTIME EXECUTION TEMPLATES

(75) Inventors: Theodore Allen Huck, Santa Clara, CA (US); Chris LaRue, Santa Cruz, CA (US)

(73) Assignee: Intellisync Corporation, San Jose, CA (US)

( * ) Notice: Subject to any disclaimer, the term of this patent is extended or adjusted under 35 U.S.C. 154(b) by 0 days.

(21) Appl. No.: 09/256,845

(22) Filed: Feb. 24, 1999

(51) Int. Cl.
*G06F 17/00* (2006.01)
(52) U.S. Cl. .................................................. 715/513
(58) Field of Classification Search ............... 707/513, 707/522, 523, 526, 517, 532; 715/513, 517, 715/522, 523, 526, 532; 709/318
See application file for complete search history.

(56) References Cited

U.S. PATENT DOCUMENTS

| 4,225,920 | A |   | 9/1980  | Stokes          |        |
|-----------|---|---|---------|-----------------|--------|
| 4,796,179 | A |   | 1/1989  | Lehman et al.   |        |
| 4,964,042 | A |   | 10/1990 | Sterling et al. |        |
| 5,040,213 | A | * | 8/1991  | Yasuda et al.   | 281/41 |
| 5,051,898 | A |   | 9/1991  | Wright et al.   |        |
| 5,327,568 | A |   | 7/1994  | Maejima et al.  |        |
| 5,345,588 | A |   | 9/1994  | Greenwood et al.|        |
| 5,425,128 | A |   | 6/1995  | Morrison        |        |
| 5,475,842 | A |   | 12/1995 | Gilbert et al.  |        |
| 5,555,369 | A |   | 9/1996  | Menendez et al. |        |
| 5,706,502 | A | * | 1/1998  | Foley et al.    | 707/10 |
| 5,768,510 | A |   | 6/1998  | Gish            |        |
| 5,778,368 | A |   | 7/1998  | Hogan et al.    |        |
| 5,828,842 | A |   | 10/1998 | Sugauchi et al. |        |
| 5,848,246 | A |   | 12/1998 | Gish            |        |
| 5,922,065 | A |   | 7/1999  | Hull et al.     |        |
| 6,012,098 | A |   | 1/2000  | Bayeh et al.    |        |
| 6,055,522 | A | * | 4/2000  | Krishna et al.  | 707/517|
| 6,101,510 | A | * | 8/2000  | Stone et al.    | 707/513|
| 6,137,483 | A | * | 10/2000 | Kiyono et al.   | 705/27 |
| 6,263,352 | B1| * | 7/2001  | Cohen           | 707/513|
| 6,286,043 | B1| * | 9/2001  | Cuomo et al.    | 709/223|

(Continued)

*Primary Examiner*—Sanjiv Shah
(74) *Attorney, Agent, or Firm*—Ernest J. Beffel, Jr.; Haynes Beffel & Wolfeld LLP (57) ABSTRACT

A dynamic application environment or system is described that includes a client, a run-time system, and a back-end database. The client comprises a workstation or desktop PC running browser software, such as Microsoft Internet Explorer or Netscape Navigator. The back-end database comprises a back-end (e.g., server-based) database system, such as an SQL-based database system. The run-time system includes a collection or repository module for storing "presentation templates," a Template Services Module or engine, a Template Parameters Module, and a Database Accessor Module. The presentation templates are employed for presentation of the application to the user interface (at the client). At application run-time, the templates are provided to the Template Services Module, which includes a Template Manager and a Template Parser. These provide generic processing of the templates, which may be assembled to complete a finished product (i.e., run-time application). For instance, the Template Services Module knows how to load and parse a template and then look up its parameters, regardless of the application-specific details (e.g., user interface implementation) embodied by the template. In use, the system is deployed with presentation templates that represent the various client views of the target application, for the various platforms that the application is deployed to. In this manner, when new functionality needs to be added to the system, it may simply be added by expanding the run-time library portion of the system.

43 Claims, 7 Drawing Sheets

U.S. PATENT DOCUMENTS 6,301,590 B1 * 10/2001 Siow et al. .................. 707/500
6,336,137 B1 * 1/2002 Lee et al. .................... 709/219
6,343,297 B1 * 1/2002 D'Anjou et al. ......... 707/104.1
6,430,568 B1 * 8/2002 Hickey et al. .......... 707/103 Z

* cited by examiner

SYSTEM AND METHODOLOGY FOR DYNAMIC APPLICATION ENVIRONMENT EMPLOYING RUNTIME EXECUTION TEMPLATES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing and, more particularly, to system and methods for facilitating deployment and execution of computer application programs, particularly those deployed on heterogenous or multi-platform environments.

The first personal computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs." With the ever-increasing popularity of the Internet, particularly the World Wide Web ("Web") portion of the Internet, however, more and more personal computers are connected to larger networks. Providing access to vast stores of information, the Internet is typically accessed by users through Web "browsers" (e.g., Microsoft Internet Explorer or Netscape Navigator) or other "Internet applications." The explosive growth of the Internet has fostered a distributed computing environment, with a dramatic effect on the data processing operations of many businesses and other organizations. Today, for example, employees access their corporate data through the Internet using a variety of different hardware configurations.

Figure 1A:
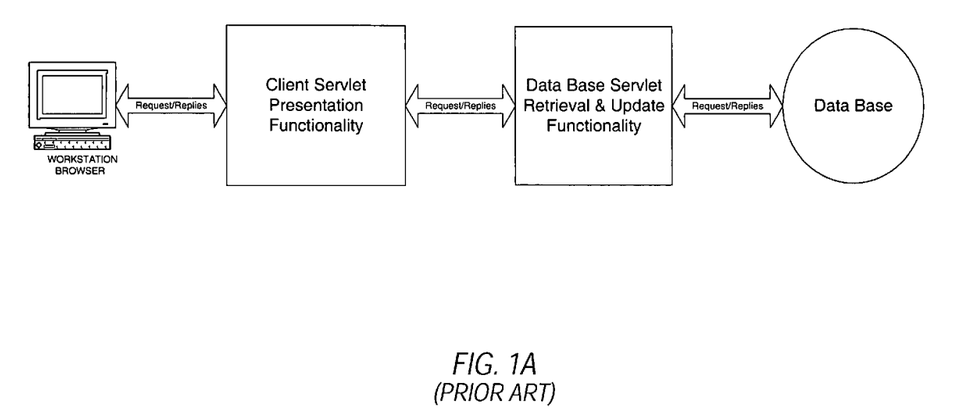
FIG. 1A is a block diagram illustrating a common (prior art) configuration comprising a client machine or workstation running browser software that executes applet code (e.g., Java applet) downloaded from a server residing on the Internet.

Today, multi-platform distributed computing environments are pervasive. Such environments are characterized by multiple computers connected to a network, such as "client" computers connected to one or more "host" computers via a network. A common configuration is a client machine or workstation running browser software that executes applet code (e.g., Java applet) that is downloaded from a server residing on the Internet, such as illustrated in FIG. 1A. Since the protocols used for communication (e.g., TCP/IP) support a variety of platforms, an almost infinite variety of hardware-platform configurations is possible.

A common problem exists in such environments, however. Often, a software development shop or engineering group is required to manage a code base that must exist within the framework of many different customer-specified requirements. Consider, for instance, client-side application software that presents information from a database server (e.g., residing on the Internet) using a browser (e.g., Java-enabled browser) running at a client or desktop computer. For a software development shop that services large telecommunications providers, a substantial amount of customization is often required for ensuring that the deployed application executes properly at the browser and according to customer specification. For example, the customer often requires a customized user interface, with customer-specified colors and presentation order. Additionally, customers often want to add new features, so that the application may adapt as technology changes. Typically, such customization is done using cut and paste techniques (i.e., copying or moving program code from one location to another, or possibly removing it altogether). Regardless of how such changes are effected, once significant changes have been made, the entire program must be rebuilt. As a result, the task of accommodating customer-specific changes to the code is a costly undertaking.

Further, the developer is faced with the problem that his or her code base never stabilizes. Instead, one is faced with an ever-changing code base—always in a constant state of flux. This is disruptive to the overall development process as there is no stable code base in which to track errors or "bugs," or to apply necessary fixes. As more and more changes are requested, the increasingly unstable code base becomes impractical to manage and impossible to effect bug fixes. At the same time, however, the functionality to be implemented at the client is a finite set of functionality, or at least a known set that can be increased. The underlying functionality needed for getting the information from the database server to the client is independent of the functionality required to actually present that information (i.e., display it on screen) at the client computer. In other words, how one presents the information at the client is independent of how one gets the information from the database.

Figure 1B:
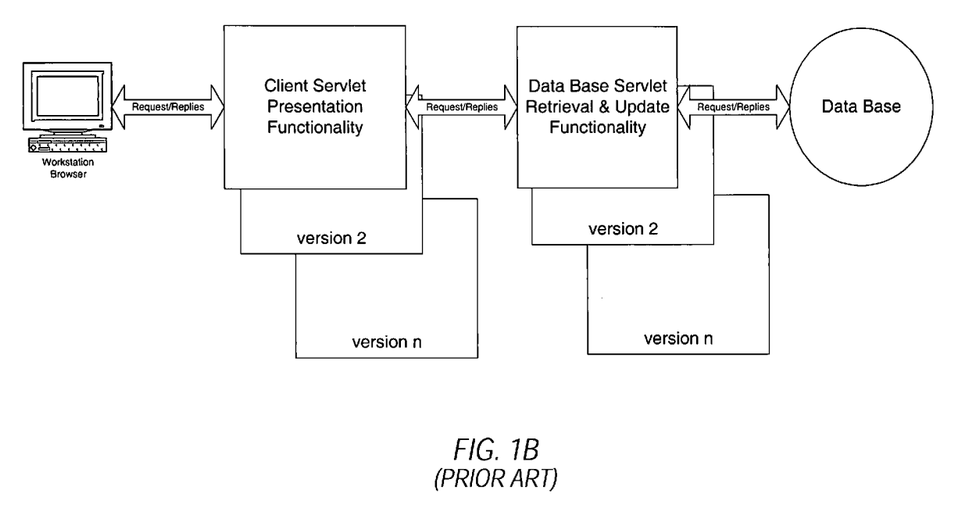
FIG. 1B is a block diagram illustrating that the configuration of FIG. 1A may lead to "versioning" problems (i.e., creating multiple, incompatible versions) among the software (e.g., components) employed.

As illustrated in FIG. 1B, this may lead to further difficulties, however. If the presentation software is "versioned" separately from that of the back-end software, then a many-to-many relationship results between the code, thus greatly increasing the complexity of managing the respective code bases. For example, a software vendor may need to support a variety of different browsers, each of which itself may run on a variety of different operating system platforms. Keeping all of these different versions working correctly is a monumental task for vendors.

What is needed are system and tools that allow one to manage a code base that represents the entirety of the required solutions. Such a solution should accommodate customization with relative ease. The present invention fulfills this and other needs.

SUMMARY OF THE INVENTION

A dynamic application environment or system is described that includes a client, a run-time system, and a back-end database. The client comprises a workstation or desktop PC running browser software, such as Microsoft Internet Explorer or Netscape Navigator. The back-end database comprises a back-end (e.g., server-based) database system, such as an SQL-based database system, which is available from a variety of vendors (e.g., Oracle 8, available from Oracle Corp. of Redwood Shores, Calif.).

The run-time system includes a collection or repository module for storing "presentation templates," an Abstract Presentation Template Services Module (or simply, "Template Services Module") or engine, a Template Parameters Module, and a Database Accessor Module. The presentation templates are employed for presentation of the application to the user interface. The presentation templates, which are maintained in the template repository as a collection of binary template files, are associated with a number of parameters that can be "plugged into" it. These parameters are managed by the Template Parameters Module, which includes a set of standard functions (typically implemented only once for all platforms) for interacting with the database.

At application run-time, the templates are provided to the Template Services Module, which includes a Template Manager and a Template Parser. These provide generic processing of the templates. Here, the templates may be thought of as pieces of clockwork, which may be assembled to complete a finished product (i.e., run-time application). For instance, the Template Services Module knows how to load and parse a template and then look up its parameters, regardless of the application-specific details (e.g., user interface implementation) embodied by the template. In the currently-preferred embodiment, the templates comprise HTML (hypertext markup language) templates for run-time generation of HTML pages, as well as other document forms.

The Abstract Presentation Template Services Module represents the set of run-time core services or engine functions that are provided by the back-end abstraction. In basic operation, the module invokes particular back-end functionality, including retrieving data, based on instructions embodied in the template(s) currently being processed. In essence, the services module publishes services (i.e., an interface or published list defining externalized functions that may be invoked) that are available from the back-end. More particularly, since the functions may be published, the system can selectively surface them in configurable sets of particular services (i.e., functions).

The back-end database itself represents the business objects or other information of interest to the executing application. In the currently-preferred embodiment, the back-end database comprises Grand Unification Database or GUD, which serves as a reference database facilitating synchronization among one or more clients. By storing the data that is actually being synchronized (i.e., storing the actual physical body of a memo, for instance) inside a reference database (i.e., a special database or by a specially-designated one of the client data sets) under control of a central or core synchronization engine, rather than transferring such data on a point-to-point basis, the GUD provides a repository of information that is available at all times and does not require that any other synchronization client (e.g., PIM client or hand-held device) be connected. Although the currently-preferred embodiment employs the GUD-based database, the present invention itself may be implemented using a conventional database, such as an SQL database server or other reliable database management system.

In use, the system is deployed with presentation templates that represent the various client views of the target application, for the various platforms that the application is deployed to. Template processing at run-time is as follows. During run-time invocation of the system, the relevant template(s) for a given client is parsed by a Template Tokenizer/Template Parser (from the Abstract Presentation Template Services) for creating an in-memory binary representation of the template information (i.e., "compiled" templates), which is stored in a template cache. Here, the template includes various text strings appropriate for rendering a user interface display at the client, together with tokens representing particular functions to be invoked.

The compiled templates are processed by the Template Manager (from the Abstract Presentation Template Services) which operates in conjunction with a Parameter Dictionary. As the Template Manager reads each compiled HTML template object, the Parameter Dictionary allows the Template Manager to determine which run-time services are to be invoked. In effect, the Parameter Dictionary, which functions in a manner akin to a compiler's symbol table, allows the Template Manager to resolve the various references pertinent to the compiled tokens which comprise an HTML object into one or more run-time service invocations. In the currently-preferred embodiment, the various run-time services or functions are grouped into particular sets of run-time services. At this point in the Template Manager, a sequence of "switch" statements are employed for looping through the various tokens and, in response, invoking corresponding run-time handlers. The run-time handlers, in turn, resolve the invocations into corresponding database queries (e.g., SQL queries), for communicating with the back-end database. The Template Manager includes support for looping constructs (e.g., "for" and "while" statements), which may be embedded into custom or user-defined HTML tags.

Since the Template Tokenizer, Template Parser, and Template Manager are generic, from one application to another, these represent "hard" portions of the system—that is, portions of the system that are invariant from one application deployment to the next. The system grows with functionality through those portions of the system that provide services that are referenced by the templates. In other words, when new functionality needs to be added to the system, it is added by expanding the run-time library portion of the system, with that newly-added functionality being appropriately referenced in the Parameter Dictionary.

An exemplary method of the present invention may be summarized as follows. First, at least one template is created, where the template(s) includes references (e.g., tokens) to specific functionality that is to be invoked at a given client. Next, the references in the template(s) are registered in a dictionary (template "parameters" dictionary) so that the references (i.e., tokens) to run-time services can the associated with corresponding run-time handlers (i.e., for invoking the appropriate run-time services). At actual application execution at a particular client, the method continues as follows. A run-time request is received from the particular client to load the template(s). Here, the template, which is in the form of an HTML document (which may be loaded by client browser software), is parsed by a template manager. From the dictionary and from the references or tokens embedded in the template, the template manager may determine the specific functionality that is to be invoked for the particular client. Accordingly, application execution proceeds by invoking the corresponding run-time handlers for the determined references. This may include, for instance, retrieving and modifying information stored on a back-end database, such as an SQL database server.

DETAILED DESCRIPTION OF A PREFERRED EMBODIMENT

The following description will focus on the presently-preferred embodiment of the present invention, which is operative in a network environment, including, for instance, client machines running browser software operating under the Microsoft® Windows environment and connected to a network, such as a LAN, WAN, or the Internet. The present invention, however, is not limited to any particular one application or any particular environment. Instead, those skilled in the art will find that the system and methods of the present invention may be advantageously applied to a variety of system and application software, including database management systems, word processors, spreadsheets, and the like, operating on a variety of different platforms, including Macintosh, UNIX, NextStep, and the like. Therefore, the description of the exemplary embodiments which follows is for purposes of illustration and not limitation.

System Architecture

A. System Hardware (for Client and/or Server Machines)

Figure 2A:
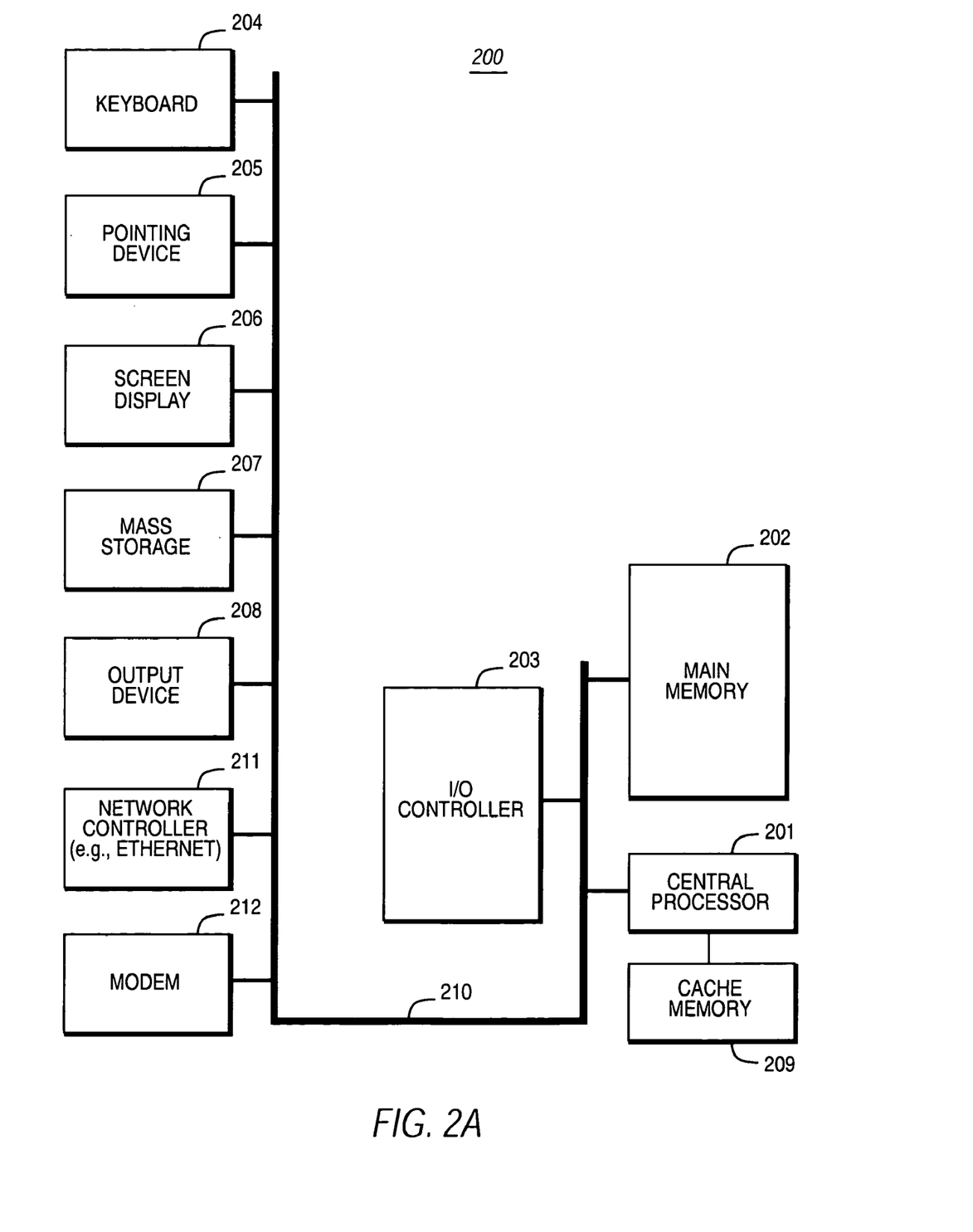
FIG. 2A is a block diagram illustrating a computer system in which the present invention may be embodied.

The invention is generally embodied on a computer system including one or more computer systems, such as computer system 200 of FIG. 2A, operating on a network. System 200 comprises a central processor 201, a main memory 202, an input/output controller 203, a keyboard 204, a pointing device 205 (e.g., mouse, track ball, pen device, or the like), a display or screen device 206, and a mass storage 207 (e.g., hard or fixed disk, removable floppy disk, optical disk, magneto-optical disk, or flash memory), a network interface card or controller 211 (e.g., Ethernet), and a modem 212 (e.g., 28.8K baud modem or ISDN modem). Although not shown separately, a real-time system clock is included with the system 200, in a conventional manner. Processor 201 includes or is coupled to a cache memory 209 for storing frequently-accessed information; memory 209 may be an on-chip cache or external cache (as shown). One or more input/output device(s) 208, such as a printing device or slide output device, are included in the system 200, as desired. As shown, the various components of the system 200 communicate through a system bus 210 or similar architecture. The system itself communicates with other systems via a network interface card 211 (e.g., available from 3Com of Santa Clara, Calif.) and/or a modem 212 (also available from 3Com). In a preferred embodiment, the system 200 includes an IBM PC-compatible personal computer, available from a variety of vendors (including IBM of Armonk, N.Y.). I/O device 208 may include a laser printer, such as an HP Laserjet printer, which is available from Hewlett-Packard of Palo Alto, Calif.

B. System Software (for Controlling Clients and Server Machines)

Figure 2B:
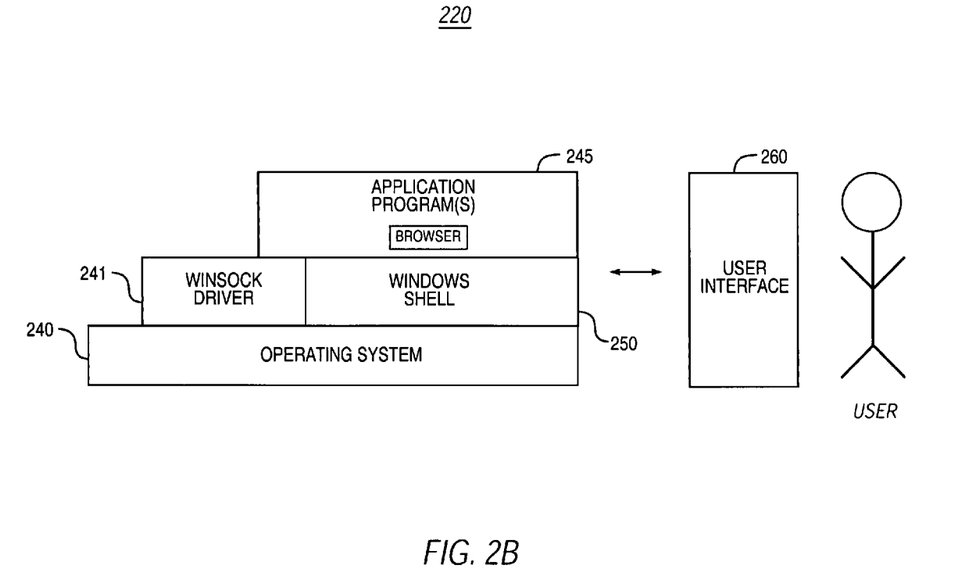
FIG. 2B is a block diagram illustrating a computer software system employed for directing the operation of the computer system of FIG. 2A.

Illustrated in FIG. 2B, a computer software system 220 is provided for directing the operation of the computer system 200. Software system 220, which is stored in system memory 202 and on storage (e.g., disk memory) 207, includes a kernel or operating system (OS) 240 and a windows shell 250. One or more application programs, such as client application software or "programs" 245 may be "loaded" (i.e., transferred from storage 207 into memory 202) for execution by the system 200. In a preferred embodiment, client application software includes a Web browser (e.g., Netscape Navigator or Microsoft Internet Explorer) which communicates through a communication layer or driver 241 (e.g., Winsock—a Windows implementation of TCP/IP Transmission Control Protocol/internet Protocol (TCP/IP)) with the Internet.

System 220 includes a user interface (UI) 260, preferably a Graphical User Interface (GUI), for receiving user commands and data. These inputs, in turn, may be acted upon by the system 200 in accordance with instructions from operating module 240, windows 250, and/or client application module(s) 245. The UI 260 also serves to display the results of operation from the OS 240, windows 250, and application(s) 245, whereupon the user may supply additional inputs or terminate the session. OS 240 and windows 245 can be provided by Microsoft® Windows 9x, by Microsoft® Windows NT (or successor Microsoft® Windows 2000), or by Microsoft® Windows 3.x (operating in conjunction with MS-DOS); these are available from Microsoft Corporation of Redmond, Wash. Alternatively, OS 240 and windows 245 can be provided by IBM OS/2 (available from IBM of Armonk, N.Y.), Macintosh OS (available from Apple Computers of Cupertino, Calif.), or UNIX OS, such as Linux (available from a variety of vendors). Although shown conceptually as a separate module, the UI is typically provided by interaction of the application modules with the windows shell, both operating under OS 240.

Dynamic Application Environment Employing Runtime Execution Templates

A. System Design and Operation

1. Run-Time User View

Figure 3:
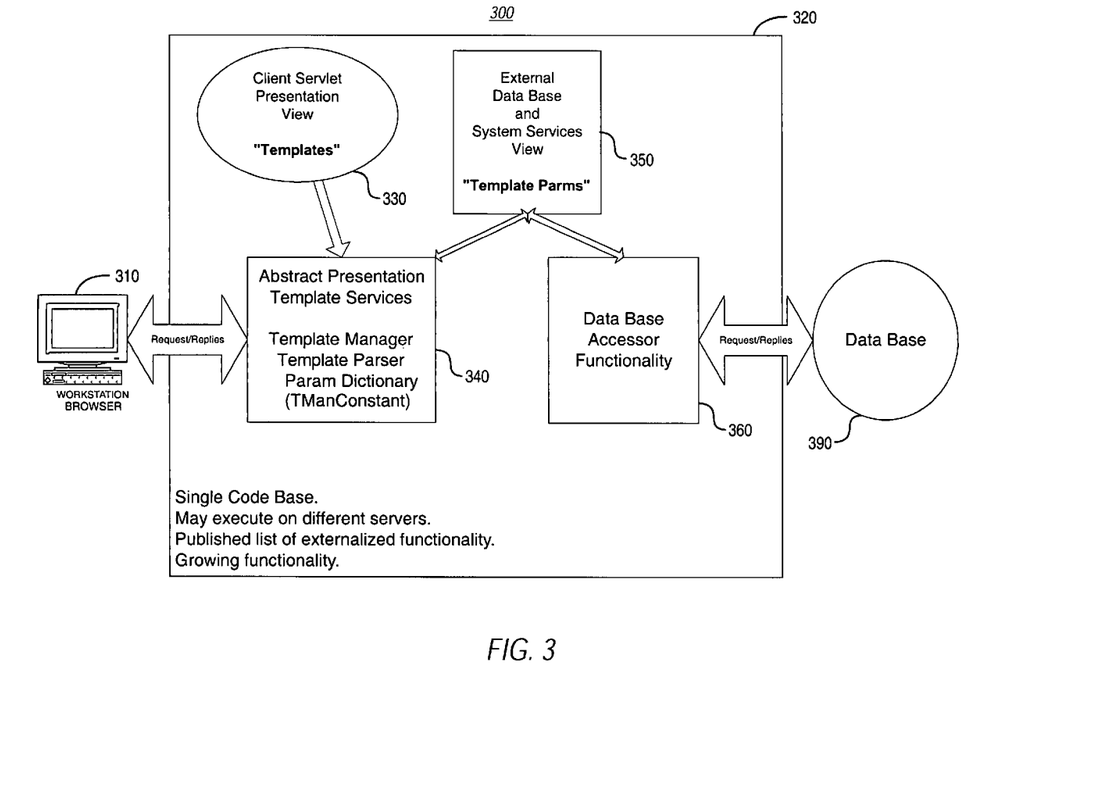
FIG. 3 is a block diagram providing a high-level representation of a dynamic application environment or system constructed in accordance with the present invention.

As shown in FIG. 3, a dynamic application environment or system 300 constructed in accordance with the present invention includes a client 310, a run-time system 320, and a back-end database 390. Client 310 comprises a workstation or desktop PC (e.g., system 200) running browser software (e.g., software 245), such as Microsoft Internet Explorer (available from Microsoft Corporation of Redmond, Wash.) or Netscape Navigator (available from Netscape, Inc. of Mountain View, Calif.). The back-end database 390 comprises a back-end (e.g., server-based) database system, such as an SQL-based database system, which is available from a variety of vendors (e.g., Oracle 8, available from Oracle Corp. of Redwood Shores, Calif.).

As shown, the run-time system 320 includes a collection or repository module 330 for storing "presentation templates," a Template Services Module or engine 340, a Template Parameters Module 350, and a Database Accessor Module 360. The presentation templates are employed for presentation of the application to the user interface. The presentation templates, which are maintained in the template repository 330 as a collection of binary template files, are associated with a number of parameters that can be "plugged into" it. As shown, these parameters are managed by the Template Parameters Module 350, which includes a set of standard functions (typically implemented only once for all platforms) for interacting with the database 390.

At application run-time, the templates are provided to the Template Services Module 340, which includes a Template Manager and a Template Parser. These provide generic processing of the templates. Here, the templates may be thought of as pieces of clockwork, which may be assembled to complete a finished product (i.e., run-time application). For instance, the Template Services Module 340 knows how to load and parse a template and then look up its parameters, regardless of the application-specific details (e.g., user interface implementation) embodied by the template. In the currently-preferred embodiment, the templates comprise HTML (hypertext markup language) templates for run-time generation of HTML pages, as well as, other document forms. Those skilled in the art, enabled by the teachings herein, will appreciate that the present invention may be implemented using other page description technologies (e.g., Standard Generalized Markup Language or SGML), however. Therefore, the HTML embodiment described herein is for purposes of illustration and not limitation.

The Abstract Presentation Template Services Module 340 represents the set of run-time core services or engine functions that are provided by the back-end abstraction. In basic operation, the module invokes particular back-end functionality, including retrieving data, based on instructions embodied in the template(s) currently being processed. In essence, the services module 340 publishes services (i.e., an interface or published list defining externalized functions that may be invoked) that are available from the back-end. More particularly, since the functions may be published, the system can selectively surface them in configurable sets of particular services (i.e., functions).

The back-end database 390 itself represents the business objects or other information of interest to the executing application. In the currently-preferred embodiment, the back-end database 390 comprises Grand Unification Database or GUD, which serves as a reference database facilitating synchronization among one or more clients. By storing the data that is actually being synchronized (i.e., storing the actual physical body of a memo, for instance) inside a reference database (i.e., a special database or by specially-designated one of the client data sets) under control of a central or core synchronization engine, rather than transferring such data on a point-to-point basis, the GUD provides a repository of information that is available at all times and does not require that any other synchronization client (e.g., PIM client or hand-held device) be connected. Detailed description of the GUD-based database is described in commonly-owned U.S. application Ser. No. 09/136,215, filed Aug. 18, 1998, entitled SYSTEM AND METHODS FOR SYNCHRONIZNG TWO OR MORE DATASETS, the disclosure of which is hereby incorporated by reference. Although the currently-preferred embodiment employs the GUD-based database, the present invention itself may be implemented using a conventional database, such as an SQL database server or another reliable database management system.

As implemented in the currently-preferred embodiment, the system 320 exists as a single code base. Accordingly, the system 320 cannot get out of sync with itself, since multiple versions of it do not exist. Therefore, regardless of which platform the system 320 is deployed on, the same set of modules—the single code base—are employed. Individual variations from platform to platform are handled through the templates.

2. Run-Time Internal View

Figure 4:
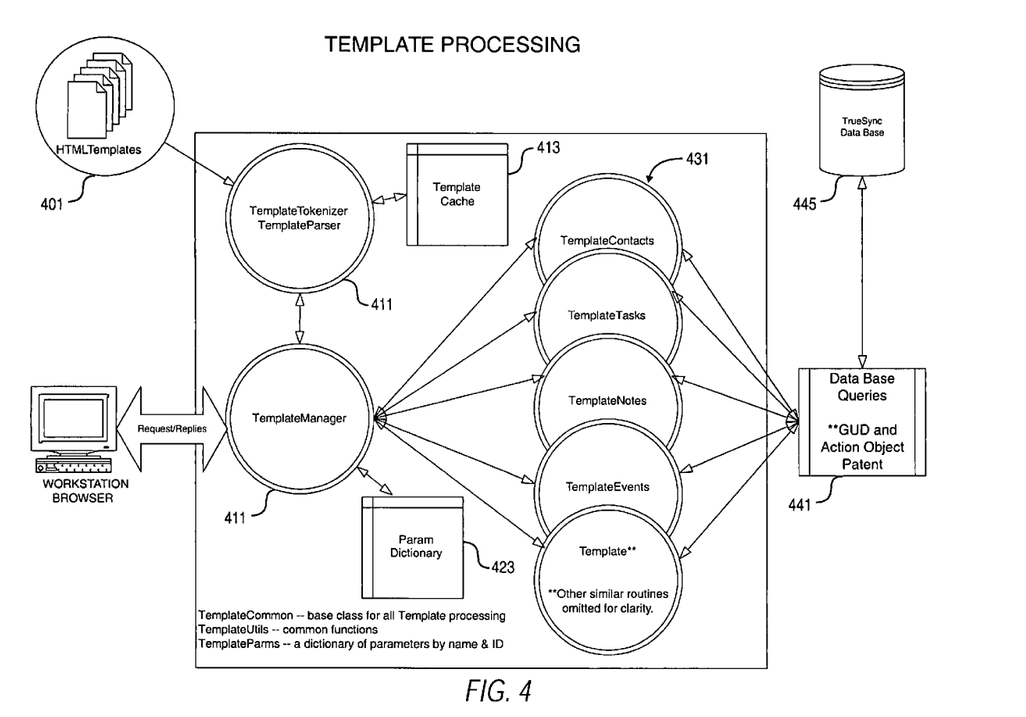
FIG. 4 is a block diagram illustrating template processing at run-time, by the system of the present invention.

In use, the system is deployed with presentation templates that represent the various client views of the target application, for the various platforms that the application is deployed to. FIG. 4 illustrates template processing at run-time. During run-time invocation of the system, the relevant template(s) 401 for a given client is parsed by a Template Tokenizer/Template Parser 411 (from the Abstract Presentation Template Services 340) for creating an in-memory binary representation of the template information (i.e., "compiled" templates), which is stored in a template cache 413. Here, the template includes various text strings appropriate for rendering a user interface display at the client, together with tokens representing particular functions to be invoked.

The compiled templates are processed by the Template Manager 421 (from the Abstract Presentation Template Services 340), which operates in conjunction with a Parameter Dictionary 423. As the Template Manager 421 reads each compiled HTML template object, the Parameter Dictionary 423 allows the Template Manager to determine which run-time services is to be invoked. In effect, the Parameter Dictionary, which functions in a manner akin to a compiler's symbol table, allows the Template Manager to resolve the various references pertinent to the compiled tokens which comprise an HTML object into one or more run-time service invocations. In the currently-preferred embodiment, the various run-time services or functions are grouped into particular sets of run-time services, as illustrated at 431. At this point in the Template Manager, a sequence of "switch" statements are employed for looping through the various tokens and, in response, invoking corresponding run-time handlers. The run-time handlers, in turn, resolve the invocations into corresponding database queries (e.g., SQL queries), shown at 441, for communicating with the back-end database, shown at 445. The Template Manager includes support for looping constructs (e.g., "for" and "while" statements), which may be embedded into custom or user-defined HTML tags.

Since the Template Tokenizer, Template Parser, and Template Manager are generic, from one application to another, these represent "hard" portions of the system—that is, portions of the system that are invariant from one application deployment to the next. The system grows with functionality through those portions of the system that provide services that are referenced by the templates. In other words, when new functionality needs to be added to the system, it is added by expanding the run-time library portion of the system, with that newly-added functionality being appropriately referenced in the Parameter Dictionary.

B. HTML Templates

Before describing construction of HTML templates of the present invention in further detail, it is helpful to first review in further detail both the internal organization of HTML documents and the operation of HTTP protocol for transmitting HTML documents to Web clients.

1. Overview of HTML Documents

The majority of content available on the Internet is represented in "HTML" documents which, in turn, are read or accessed by Web browsers. In particular, the HTML or Hypertext Markup Language is the scripting language used to create the documents for the World Wide Web. Although most browsers will display any document that is written in plain text, HTML documents afford several advantages. In particular, HTML documents include formatting, graphics, and "hypertext links" to other documents.

Markup languages are used to describe the structure of the document. HTML is used to mark various elements in a document, including headings, paragraphs, lists, tables, and the like. To achieve this, an HTML document includes formatting commands or "tags" embedded within the text of the document which serve as commands to a browser. Here, HTML tags mark the elements of a file for browsers. Elements can contain plain text, other elements, or both. The browser reading the document interprets these markup tags or commands to help format the document for subsequent display to a user. The browser thus displays the document with regard to features that the viewer selects either explicitly or implicitly. Factors affecting the layout and presentation include, for instance, the markup tags used, the physical page width available, and the fonts used to display the text.

The design of HTML tags is relatively simple. Individual HTML tags begin with a <("less than") character and end with a> ("greater than") character, such as <title> which serves to identify text which follows as the title of a document. HTML tags are not case-sensitive (with the exception of HTML escape sequences) and are often used in symmetric pairs, with the final tag indicated by the inclusion of a /(slash) character. For instance, the <title> tag represents a beginning tag which would be paired with a </title> ending tag. These paired commands would thus be applied to the text contained within the beginning and ending commands, such as <title> My Sample Title </title>. The <B> tag, on the other hand, informs browsers that the text which follows is to be in bold type. This bolding is turned off by the inverse markup tag </B>. In contrast to these paired or "container" tags, separator tags are used unpaired. For example, the command <br> is employed by itself to insert a line break. Browsers generally ignore extra spaces and new lines between words and markup tags when reading the document. In other words, "white space" characters, such as tabs, spaces, and new line characters, are generally ignored in HTML. Leaving a blank line in one's document, for instance, generally does not create a blank line when the document is displayed in a browser, unless one uses the "preformatted" HTML tag (<pre> and </pre>). Finally, not all tags are supported by all Web browsers. If a browser does not support a tag, it (usually) just ignores it.

2. HTML Tags and Document Layout

Every HTML document requires certain standard HTML tags in order to be correctly interpreted by Web browsers. Each document consists of head and body text. The head contains the title, and the body contains the actual text that is made up of paragraphs, lists, and other elements. Browsers expect specific information because they are programmed according to HTML (or SGML) specifications.

The basic layout of an HTML document, including required elements, is illustrated in the following simple HTML document.

<HTML>

<HEAD>

<TITLE> Title of the Web page </TITLE>

</HEAD>

<BODY>

An example of a simple

<B>Web</B> page.

</BODY>

</HTML>

As illustrated, required elements include the <HTML>, <HEAD>, <TITLE>, and <BODY> tags, together with any corresponding end tags. The tags used function as follows. The first pair of tags, <HTML><HTML>, defines the extent of the HTML markup text. The <HEAD></HEAD>tag pair contains descriptions of the HTML page; this meta information is not displayed as part of the Web page. The <TITLE><TITLE> tag pair describes the title of the page. This description is usually displayed by the browser as the title of the window in which the Web page is displayed. This information is also used by some search engines to compile an index of Web pages. The next tag pair, <BODY></BODY>, delimits the body of the Web page. In the body is the text to be displayed as well as HTML markup tags to hint at the format of the text. For example, the <B></B> tag pair displays the enclosed text in a bold typeface. Further description of HTML documents is available in the technical and trade literature; see e.g., Ray Duncan, *Power Programming: An HTML Primer*, PC Magazine, Jun. 13, 1995, the disclosure of which is hereby incorporated by reference.

3. Transmission of HTML Documents: HTTP

"HTTP" or HyperText Transfer Protocol is a standardized transfer protocol employed to maintain interoperability among machines connected to an open network, such as the Internet. Browsers and other Internet applications includes the ability to access a URL (Universal Resource Locator) or "Web" site. The URL is used to specify the location of a file held on a remote machine. Each URL itself is composed of several distinct components. For example, the URL http://host/file.html includes three distinct components. The first component, http, specifies the protocol (here, HTTP) that is to be used to access the target file. Other access protocols can be specified by a URL. For example, the URL of ftp://ftp.starfish.com/pub/docs/samples specifies access to files via "FTP" (File Transfer Protocol). This specifies a link for accessing the file directory docs/samples on the machine ftp.starfish.com.

Thus, HTTP may be viewed as the communication foundation of the World Wide Web. This request/response protocol is used on top of TCP (Transmission Control Protocol) and carries commands from browsers to servers and responses from servers back to browsers. HTTP is a protocol, not so much for transferring hypertext per se, but for transmitting information with the efficiency necessary to make hypertext jumps. The data transferred by the protocol can be plain text, hypertext, audio, images, or any Internet-accessible information. Here, HTTP may be viewed as a transaction-oriented client/server protocol; it treats each transaction independently. A typical implementation creates a new TCP connection between a client and a server for each transaction, then terminates the connection as soon as the transaction completes. Since the protocol does not require this one-to-one relationship between transaction and connection lifetimes, however, the connection can stay open so that more transactions can be made.

The transaction-based approach of HTTP is well-suited to its typical application. A normal Web session involves retrieving a sequence of pages and documents. The sequence is, ideally, performed rapidly, and the locations of the various pages and documents may be widely distributed among a number of servers, located across the country or around the globe.

In typical HTTP configuration, a client, such as a Web browser, initiates a request (HTTP message) for a resource, for instance, from a Web server where a desired home page is located. The client opens a direct connection that is end-to-end or direct connection between the client and the server. The client then issues an HTTP request. The request consists of a specific command (referred to as a method), a URL, and a message containing request parameters, information about the client, and perhaps additional content information. When the server receives the request, it attempts to perform the requested action and returns an HTTP response. The response includes status information, a success/error code, and a message containing information about the server, information about the response itself, and possible body content. The TCP connection is then closed.

Clients and servers communicate using two types of HTTP messages: request and response. A request message is sent by a client to a server to initiate some action. Exemplary actions include the following.

GET: A request to fetch or retrieve information.

POST: A request to accept the attached entity as a new subordinate to the identified URL.

PUT: A request to accept the attached entity and store it under the supplied URL. This may be a new resource with a new URL, or it may be a replacement of the contents of an existing resource with an existing URL.

DELETE: Requests that the origin server delete a resource.

The server, in response to a request, returns a response message. A response message may include an entity body containing hypertext-based information. In addition, the response message must specify a status code, which indicates the action taken on the corresponding request. Status codes are organized into the following categories:

INFORMATIONAL: The request has been received and processing continues. No entity body accompanies this response.

SUCCESSFUL: The request was successfully received, understood, and accepted.

REDIRECTION: Further action is required to complete the request.

CLIENT ERROR: Request contains a syntax error or request cannot be fulfilled.

SERVER ERROR: The server failed to fulfill an apparently valid request.

Further description of HTTP is available in the technical and trade literature; see e.g., William Stallings, *The Backbone of the Web*, BYTE, October 1996, the disclosure of which is hereby incorporated by reference.

4. Sample HTML Template

With an understanding of the construction, layout, and transmission of HTML documents, the reader may better appreciate the HTML template approach of the present invention. A sample form entry (i.e., add card) HTML template may, for example, be constructed in accordance with the present invention as follows (with line numbers added for clarity of the following description).

```
 1: <!--
 2: Copyright (C) 1998 Starfish Software Corp. All Rights Reserved.
 3: $Workfile: cardAdd.html $
 4: -->
 5: <HTML>
 6: <HEAD>
 7: <TITLE>Create Contact</TITLE>
 8: <TSS CARD_FETCH_WITH_BLANKS>
 9:
10: <SCRIPT LANGUAGE="JavaScript">
11: <TSS INCLUDE_TEMPLATE "lib/isEmpty.html">
12: <TSS INCLUDE_TEMPLATE "contacts/commonCardEdit.html">
13:
14: function opencardEdit(form){
15:     mom = window.opener;
16:     window.document.cardEdit.V_Last_Name.focus( );
17: }
18: function closecardEdit( ) {
19:     lastName = document.cardEdit.V_Last_Name.value;
20:     firstName = document.cardEdit.V_First_Name.value;
21:
22:     if (!isEmpty(lastName) || !isEmpty(firstName)) {
23:         if (confirm("Do you want to add a card for the information you just
24: entered?\n Press OK to add, Cancel to close."))
25:             processCard( );
26:         else {
27:            mom.isOpen = false;
28:            self.close( );
29:         }
30:     } else {
31:         mom.isOpen = false;
32:         self.close( );
33:     }
34: }
35:
36: </SCRIPT>
37: </HEAD>
38: <BODY BGCOLOR="#ffffff" onLoad="opencardEdit(this.form)">
39:
40: <CENTER>
41:
42: <FORM NAME="cardEdit" METHOD=<TSS CONFIG_GET_FORM_METHOD> ACTION="<TSS
43: SESSION_GET_SERVLET_URL>" TARGET="BODY" onSubmit="return processCard( )">
44: <TABLE BORDER=0 CELLSPACING=0 CELLPADDING=5 BGCOLOR="#FFFFFF">
45: <TSS if (CONFIG_HAS_HTTP_HEADINGS)>
46: <TR>
47: <TD ALIGN="RIGHT" COLSPAN=2>
48: <A HREF="<TSS SESSION_GET_HELP_PATH>conAddFrm.html" TARGET="Help">
49: <IMG SRC="/+/help.gif" ALT="Help" BORDER=0 HSPACE=2></A></TD>
```

-continued

```
 50: </TR>
 51: <TSS EndIF>
 52:
 53: <TR>
 54: <TD ALIGN=CENTER COLSPAN=2>
 55: <FONT FACE="ARIAL,HELVETICA" SIZE="3"><STRONG>Add
Contact</STRONG></FONT>
 56: </TD>
 57: </TR>
 58: <TR></TR>
 59:
 60: <TR>
 61: <TD COLSPAN=2>
 62: <HR SIZE=1 COLOR="#ff0000">
 63:
 64: </TD>
 65: </TR>
 66:
 67: <TR>
 68: <TD ALIGN="RIGHT" COLSPAN=2>
 69: <INPUT TYPE="IMAGE" NAME="Add Contact" VALUE="OK" SRC="/+/add.gif"
 70: BORDER=0 HSPACE=2 ALT="Add Contact">
 71: <A HREF="javascript:closecardEdit( )" NAME="CANCEL">
 72: <IMG SRC="/+/cancelyellow.gif" ALT="Cancel" BORDER=0 HSPACE=2></A>
 73: </TD>
 74: </TR>
 75: <TSS IF (CONFIG_HAS_HTTP_HEADINGS)>
 76: <TSS IF_NOT (CARD_IS_PUBLIC)>
 77: <TR>
 78: <TD ALIGN=RIGHT>Folder
 79: </TD><TD>
 80: <TSS SELECTION_LIST (CARD_LIST_FOLDER_NO_ALL) NAME="F">
 81: <TSS GET_SELECTION_OPTIONS>
 82: <TSS END_SELECT>
 83: </TD>
 84: </TR>
 85: <TSS ENDIF>
 86: <TSS IF (CARD_IS_PUBLIC)>
 87: <INPUT TYPE="HIDDEN" NAME="F" VALUE="<TSS URL_QUERY_PARAMETER(F)>">
 88: <TSS ENDIF>
 89: <TSS ENDIF>
 90: <TSS FOR_EACH (CARD_HAS_MORE)>
 91: <TSS IF_NOT (CONFIG_HAS_HTTP_HEADINGS)>
 92: <INPUT TYPE="HIDDEN" NAME="F" VALUE="<TSS URL_QUERY_PARAMETER(F)>">
 93: <TSS ENDIF>
 94: <TR>
 95: <TD ALIGN="RIGHT" WIDTH=120>
 96: <FONT SIZE="-1" FACE="ARIAL,HELVETICA"><TSS CARD_GET_LABEL></FONT>
 97: </TD>
 98: <TD>
 99: <FONT FACE="ARIAL,HELVETICA">
100: <INPUT TYPE="TEXT" NAME="<TSS Card_get_Field_ID>" Size=33
MAXLENGTH=250
101: VALUE="<TSS CARD_GET_VALUE>">
102: </FONT>
103: </TD>
104: </TR>
105: <TSS CARD_FETCH_NEXT>
106: <TSS END_FOR_EACH>
107:
108:
109: <TR>
110: <TD ALIGN="RIGHT" COLSPAN=2>
111: <INPUT TYPE="IMAGE" NAME="Add Contact" VALUE="OK" SRC="/+/add.gif"
112: BORDER=0 HSPACE=2 ALT="Add Contact">
113: <A HREF="javascript:closecardEdit( )" NAME="CANCEL">
114: <IMG SRC="/+/cancelyellow.gif" ALT="Cancel" BORDER=0 HSPACE=2></A>
115: </TD>
116: </TR>
117: </TABLE>
118: <INPUT TYPE="HIDDEN" NAME="SESSIONID" VALUE="<TSS
SESSION_GET_ID_VALUE>">
119: <INPUT TYPE="HIDDEN" NAME="I" VALUE="0">
120: <INPUT TYPE="HIDDEN" NAME="LS" VALUE="">
121: <INPUT TYPE="HIDDEN" NAME="K" VALUE="<TSS
SESSION_GET_PARAM_kind_value>">
122: <INPUT TYPE="HIDDEN" NAME="Z" VALUE="CARD_Form_Edit_Contact">
123: <TSS IF_NOT (CARD_IS_PUBLIC)>
124: <INPUT TYPE="HIDDEN" NAME="T" VALUE="contacts/frmSet.html">
```

```
125: <TSS ENDIF>
126: <TSS IF (CARD_IS_PUBLIC)>
127: <INPUT TYPE="HIDDEN" NAME="T" VALUE="contacts/publicFrmSet.html">
128: <TSS ENDIF>
129: <INPUT TYPE="HIDDEN" NAME="FO" VALUE="<TSS URL_QUERY_PARAMETER(F)>">
130: </FORM>
131:
132: </CENTER>
133:
134: </BODY>
135: </HTML>
```

As shown, the above HTTL template is a valid HTML document. For example, it includes the previously-described standard sections, such as Header, Title, and Body sections. The document also includes href or "hyper reference" tags, which are employed for establishing a hyperlink, and includes JavaScript-defined logic.

Of particular interest herein, the HTTL template above also includes user-defined (i.e., custom) tokens, which are represented in the currently-preferred embodiment as <TSS> tags. For example, at lines 11 and 12, the HTML template defines "include" statements, using <TSS> tags, as follows:

11: <TSS INCLUDE_TEMPLATE "lib/is Empty.html">
12: <TSS INCLUDE_TEMPLATE "contacts/common-CardEdit.html">

These include statements function in a manner similar to C-style #include statements, to "include" other external files (e.g., other HTML documents). More particularly, the HTML template includes user-defined tokens representing particular functions to be invoked. Consider, for instance, the conditional logic (i.e., if statement) represented by lines 45–51:

45: <TSS if (CONFIG_HAS_HTTP_HEADINGS)>
46: <TR>
47: <TD ALIGN="RIGHT" COLSPAN=2>
48: <A HREF="<TSS SESSION_GET_HELP_PATH>conAddForm.html" TARGET="Help">
49: <IMG SRC="/+/help.gif" ALT="Help" BORDER=0 HSPACE=2></A></TD>
50: </TR>
51: <TSS EndIF>

Here, the <TSS> tag defines an if statement that invokes the following function:

CONFIG_HAS_HTTP_HEADINGS

At this point, therefore, the HTML template references a particular run-time service to invoke. Using the Parameter Dictionary, the Template Manager will resolve this reference into the appropriate run-time service invocation. For this example, the particular run-time service being referenced is one to determine whether the client configuration specifies HTTP headings. In the event that the client configuration does specify HTTP headings, the run-time service will return "True", in which case the HTML script instructions of lines 46–50 are executed. Otherwise, the run-time service will return "False", whereupon the HTML script instructions of lines 46–50 are skipped. Conditional logic statements (e.g., if statements) can be nested, as desired, as shown at lines 75–93; for example, the if statement beginning at line 75 includes two nested if statements: one beginning at line 76, the other beginning at line 86.

A for statement is illustrated at lines 90–106, using FOR_EACH and END_FOR_EACH delimiters:

90: <TSS FOR_EACH (CARD_HAS_MORE)>
106: <TSS END_FOR_EACH>

Also shown, the statement references a CARD_HAS_MORE run-time service to invoke. Also shown, the for statement includes a nested if statement, beginning at line 91.

Thus, the foregoing sample template demonstrates an HTML document that includes various text strings and HTML commands appropriate for rendering a user interface display at the client, but also includes user-defined or custom tokens representing particular functions to be invoked, depending on the particular context of the client. As demonstrated, the HTML templates include support for looping constructs (e.g., "for" and "while" statements), which may be embedded into custom or user-defined HTML tags. The Template Manager, operating in conjunction with a Parameter Dictionary, resolves various functions into one or more run-time service invocations.

C. Summary of System Operation

Figure 5:
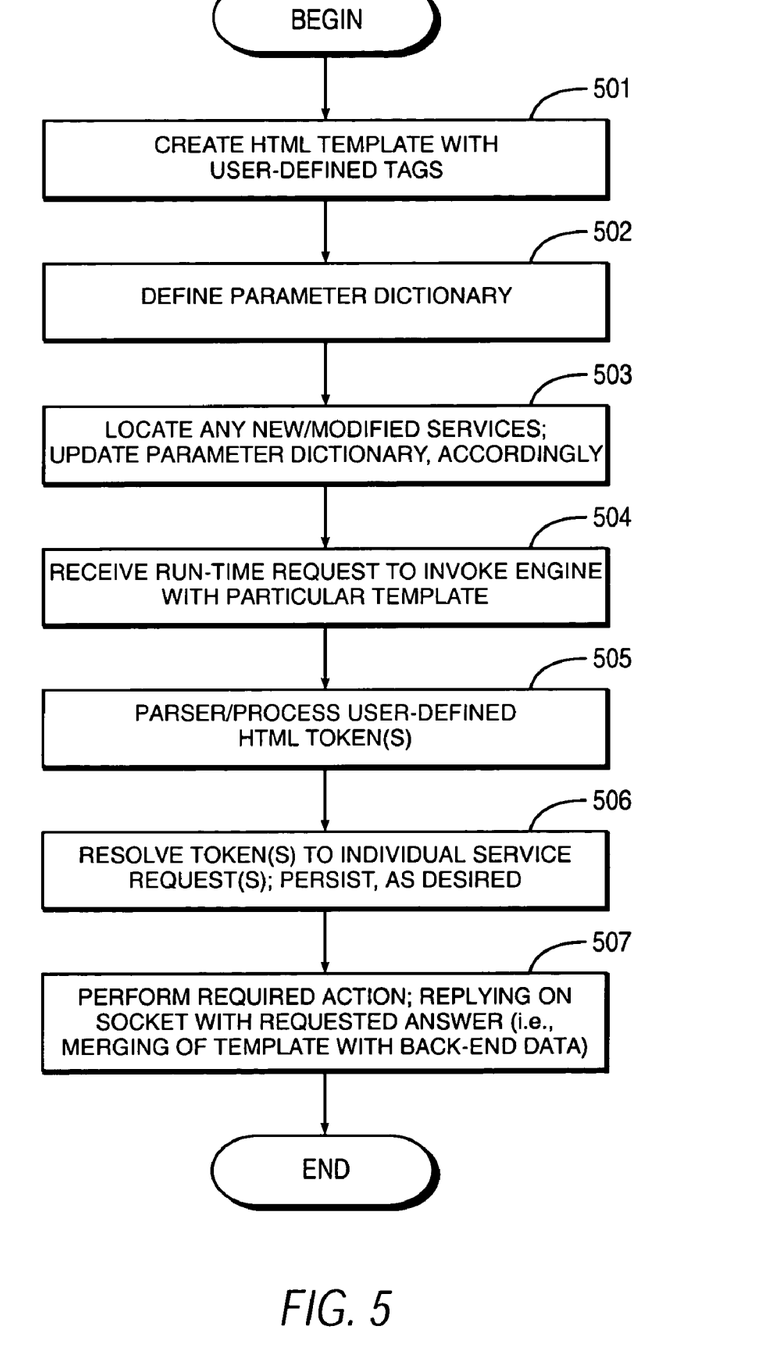
FIG. 5 is a flowchart illustrating an overall method of system operation, for the system of the present invention.

The overall method 500 of the system operation is summarized by the flowchart illustrated in FIG. 5. At step 501, an HTML template is created in a conventional manner, using any one of the commercially-available HTML editors (e.g., Netscape Navigator Gold, available from Netscape, Inc. of Mountain View, Calif.). Concurrent with this step, user-defined tags are added to the HTML template to reference the client- or platform-specific information that is to be presented at a given client. Once the template has been created, the next step is to determine what new parameters, if any, have been added to the system and, based on that determination, refresh the Parameter Dictionary. Therefore, at step 502, the method locates any newly-added parameters. Now, at step 503, the method adds any new parameters to the system by adding appropriate references to them in the Parameter Dictionary. The entries in the Parameter Dictionary, in turn, reference corresponding handlers (in the submodules), for invoking the new functionality (associated with those parameters). On the other hand, if the just-created template invokes a set of functionality already present in the system for presenting the requested information, the Parameter Dictionary need not be updated.

The next sequence of steps illustrate run-time invocation of the system, during execution of a deployed application. At step 504, the system receives a run-time request from a client (e.g., HTML browser client with socket connection) to invoke the engine (Template Manager) with a particular template(s). This request is handled, at step 505, by parsing the HTML template and processing any user-defined HTML tags. The user-defined (i.e., custom) HTML tags, in turn, include tokens—that is, the tokens representing the particular functions to be invoked for this client. In the currently-preferred embodiment, the parsing and processing takes place only once, with the results being stored (in "compiled" or binary form) in the above-mentioned template cache.

Now, the system is ready to "hookup" the template-specified tags with the corresponding services to be invoked. In other words, the individual tokens are resolved into specific service requests. This is represented by step 506, which corresponds to the "switch" statements embodied in the Template Manager, for looping through a sequence of tokens. Once this resolution has been carried out (i.e., matching tokens to appropriate service requests), the results may be persisted, thus alleviating the need for repeating the step of resolving tokens. If desired, however, the results may be flushed (i.e., discarded). It may be desirable to flush the results, for example, to facilitate deployment of a new set of templates, thereby allowing the system to refresh on the fly. Finally, the Template Manager may report the results or answer (i.e., merging of template(s)-specified functionality with data from the back end) back to the client, by replying on the communication socket that the browser opened, as indicated by step 507.

Although the foregoing has been described with reference to what are essentially "read-only" templates (as they are typically not modified by end users), the present invention may also be embodied using input form information—that is, form-required action that is specified at run-time. Here, for example, the end user may input information that is related to a particular deployment, to a particular session, and so forth and so on. A typical form-required action may include, for instance, the action of modifying data stored at the back end. Those skilled in the art, enabled by the teachings herein, will therefore appreciate that the present invention may be implemented using other template- or form-like input techniques. Irrespective of the particular format in which the functionality-to-be-invoked is registered with the system, the basic approach of providing an extensible run-time environment implemented in a single code base is preserved.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A method of creating and deploying an application that provides access to back-end information access functionality, including:
   creating at least one template including one or more abstract references that specify functionality to be invoked when a given client requests the template;
   registering the abstract references with a dictionary that associates the abstract references with at least one run-time handler and one or more run-time services; and
   providing the specified functionality to access information, including:
      receiving a request from the given client that identifies at least one template;
      accessing the identified template and determining the abstract references in the identified template;
      accessing the dictionary and determining the run-time handler and the run-time services associated with the abstract references; and
      invoking the run-time handler and the run time services to access to the back-end information access functionality.

2. The method of claim 1, wherein the at least one template comprises at least one page description language template.

3. The method of claim 2, wherein said at least one page description language template comprises at least one Hypertext Markup Language (HTML) document.

4. The method of claim 2, wherein said at least one page description language template comprises at least one Standard Generalized Markup Language (SGML) document.

5. The method of claim 1, wherein the references are embedded in the at least one template using user-defined tags.

6. The method of claim 1, wherein the back-end information access functionality that is actually invoked is determined based, at least in part, on which platform a given client executes.

7. The method of claim 1, wherein a template manager stores parsed versions of templates in a template cache, so that each template need only be parsed once.

8. The method of claim 7, wherein the parsed versions of templates are maintained on a persistent storage, so that the parsed templates are available from one session to another.

9. The method of claim 7, wherein at least one parsed version of a template is flushed, so that said system is forced to again parse the at least one template.

10. The method of claim 1, wherein the back-end information access functionality invoked is based, at least in part, on a specific client session that is executing.

11. The method of claim 1, wherein logic that implements the action of providing the specified functionality to access information consists of a single code base application that is deployed on multiple platforms.

12. The method of claim 1, wherein the abstract references include tokens specifying programming constructs.

13. The method of claim 12, wherein said programming constructs include conditional logic statements.

14. The method of claim 13, wherein said conditional logic statements include "if" statements.

15. The method of claim 13, wherein said conditional logic statements include "for" loops.

16. The method of claim 1, wherein the back-end functionality includes accessing information in a back-end database.

17. The method of claim 16, wherein the back-end database includes an SQL database system that retrieves information in response to SQL queries.

18. The method of claim 16, wherein the request can be resolved to the given client and a platform from which the request originates, further including invoking the run-time handler and the run time services using parameters corresponding to the given client and the platform.

19. The method of claim 1, wherein the back-end functionality includes accessing information in a configuration table.

20. The method of claim 1, wherein the back-end functionality includes accessing information from machine services.

21. The method of claim 1, wherein the request can be resolved to the given client, further including invoking the run-time handler and the run time services using parameters corresponding to the client identity.

22. The method of claim 1, wherein the request can be resolved to a platform from which the request originates, further including invoking the run-time handler and the run time services using parameters corresponding to the platform.

23. The method of claim 1, wherein the request can be resolved to the given client and a platform from which the request originates, further including invoking the run-time handler and the run time services using parameters corresponding to the given client and the platform.

24. The method of claim 1, wherein the abstract references specify functionality that is independent of a platform from which the request originates.

25. The method of claim 1, wherein the abstract references specify functionality that is Independent of the given client.

26. The method of claim 1, wherein the abstract references specify functionality that is independent of any particular back-end database.

27. The method of claim 1, wherein the back-end database includes a synchronization engine.

28. The method of claim 1, wherein the request can be resolved to a platform from which the request originates, further including composing a presentation adapted to the platform.

29. The method of claim 28, wherein the run time services that access information in the back-end database are independent of logic that composes the adapted presentation.

30. A template repository and template manager system that provide access to a back-end information access functionality in response to a client request for a template, including:
   a template repository that stores templates, a particular template including one or more abstract references that specify back-end information access functionality to be invoked when the client requests the particular template;
   a dictionary that associates the abstract references with one or more run-time services; and
   a template manager, responsive to the client request that identifies the particular template, including logic that accesses the template repository and parses the particular template, accesses the dictionary and resolves the abstract references to the associated run-time services, and invokes the associated run-time services that provide back-end information access functionality.

31. The system of claim 30, wherein the particular template includes at least one page description language template.

32. The system of claim 31, wherein said at least one page description language template comprises a Hypertext Markup Language (HTML) document.

33. The system of claim 31, wherein said at least one page description language template comprises a Standard Generalized Markup Language (SGML) document.

34. The system of claim 30, wherein the abstract references are embedded in the particular template using user-defined tags.

35. The system of claim 30, wherein which run-time services that are actually invoked is determined based, at least in part, on which platform a given client executes.

36. The system of claim 30, wherein said template manager stores parsed templates in a template cache, so that each template need only be parsed once.

37. The system of claim 36, wherein said parsed templates are maintained on a persistent storage, so that the parsed templates are available from one application execution session to another.

38. The system of claim 36, wherein any parsed templates are occasionally flushed, so that said system is forced to again parse the particular template.

39. The system of claim 30, wherein the back-end database comprises an SQL database system that retrieves information in response to SQL queries.

40. The system of claim 30, wherein the particular template comprises at least one read-only template.

41. The system of claim 30, wherein the particular template is loaded by browser software running at said particular client.

42. The system of claim 30, wherein the particular template comprises an input form having a platform-specific presentation when rendered at a given client.

43. The system of claim 30, wherein which run-time services are invoked is determined based, at least in part, on a specific client session that is executing.

* * * * *